W. F. RICHARDS.
SAFETY DEVICE FOR CONNECTING WHEELS AND SHAFTS.
APPLICATION FILED OCT. 13, 1904.

912,488.

Patented Feb. 16, 1909.

Witnesses:—
R. W. Renner
E. A. Volk

Inventor:
Wilhelm F. Richards,
by Wilhelm, Parkert Hard
Attorneys.

THE NORRIS PETERS CO., WASHINGTON, D. C.

UNITED STATES PATENT OFFICE.

WILLARD F. RICHARDS, OF BUFFALO, NEW YORK, ASSIGNOR TO GOULD COUPLER COMPANY, OF NEW YORK, N. Y.

SAFETY DEVICE FOR CONNECTING WHEELS AND SHAFTS.

No. 912,488.

Specification of Letters Patent.

Patented Feb. 16, 1909.

Application filed October 13, 1904. Serial No. 228,332.

*To all whom it may concern:*

Be it known that I, WILLARD F. RICHARDS, a citizen of the United States, residing at Buffalo, in the county of Erie and State of New York, have invented a new and useful Improvement in Safety Devices for Connecting Wheels and Shafts, of which the following is a specification.

This invention relates to safety devices for releasably connecting chain and other wheels to their shafts.

The safety and releasable connection hereinafter described and claimed is more particularly intended for connecting the chain wheels to the armature shafts of railway car dynamos which are driven by chains from the car axles, but the device is also capable of other applications.

Where a dynamo is driven from the car axle by a chain which cannot slip on the chain wheels, and the dynamo armature sticks from any cause due, for instance, to a hot journal or box, it is necessary to disconnect it from its drive mechanism to prevent injury to the latter or to the dynamo. Again, if the retaining bands for the armature windings should break and jam between the armature and field magnets, which sometimes happens, it is necessary to stop the armature to prevent its destruction. It is also essential at times to stop the dynamo when there is a disturbance in the electrical connections which would cause the burning out of the dynamo or other apparatus. And it is desirable also to provide means whereby the dynamo can be readily disconnected from its drive mechanism and turned to facilitate inspection or repair while the car is standing and the driving axle thus held from turning.

The object of the invention is to provide a simple desirable safety and releasable connection whereby the wheel through which power is transmitted to or from a shaft can be disconnected therefrom at will, and which will break and automatically disconnect the wheel and shaft when subjected to undue strain, to prevent injury to the driving or driven parts.

Figure 1:
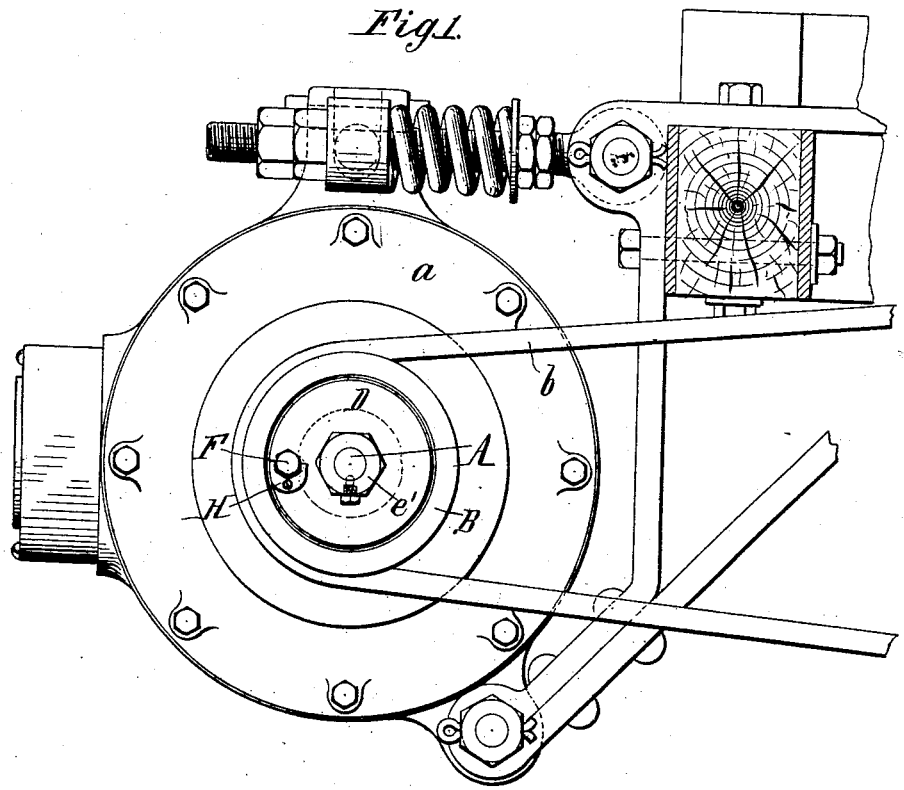
Figure 2:
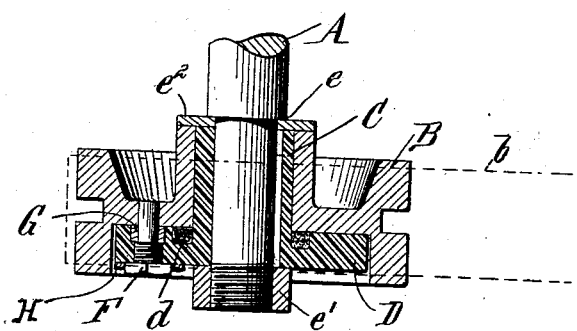

In the accompanying drawing: Figure 1 is a side elevation of a dynamo and its drive mechanism, provided with a connecting device embodying the invention. Fig. 2 is a sectional elevation, on an enlarged scale, of the armature shaft, chain wheel and connecting device.

Like letters of reference refer to like parts in the two figures.

A represents a shaft, which in the construction illustrated is the armature shaft of a dynamo $a$, and B a wheel connected to said shaft and in the present example being a chain wheel on which runs the chain $b$ for driving the armature. Preferably the wheel is not mounted directly on the shaft, but on a bushing C of bronze, or other suitable relatively soft metal, which is fixed to the shaft. The bushing is enlarged at its outer end forming a circular attaching flange or disk D, which is preferably provided in its inner face with an annular cavity or chamber $d$ for graphite or other suitable lubricant. The bushing is fixed to the shaft in any suitable way, for instance, it is keyed on a reduced portion of the shaft between a shoulder $e$ on the latter and a nut $e'$ screwed on the threaded end of the shaft, a washer $e^2$ being interposed between the inner end of the bushing and the shoulder $e$ on the shaft.

F is a detachable safety bolt or pin connecting the wheel B with the flange of the bushing to cause the wheel to turn with the bushing and shaft. The shank of the safety connecting bolt has a smooth or unthreaded portion which is received in unthreaded holes in the bushing flange and wheel, and a threaded portion which is screwed into a threaded portion of the hole in the bushing flange, and its head is hexagonal, or otherwise shaped for the engagement of a wrench or tool for turning the bolt to insert or remove it. The shank of the safety bolt is of such relative size and strength that in the event of the dynamo armature sticking for any reason, it will break or shear before the strain on the drive chain is sufficient to break the latter. When the connecting bolt is thus broken or sheared the wheel B can run freely on the bushing as a journal, and the latter will be lubricated by the graphite or lubricant in the chamber $d$ of the bushing, so that the wheel can run for a long time without heating. The wheel can at any time be disconnected from the bushing and be allowed to run free by removing the connecting bolt.

To insure the proper shearing of the bolt and prevent the enlargement and distortion of the bolt hole in the flange of the bronze bushing it is provided with a steel or hard metal sleeve G through which the smooth portion of the bolt shank passes. The holes in the opposing steel wheel and sleeve G afford shearing edges which will produce a sharp clean cut.

H represents a lock plate or device which is secured to the flange of the bushing and engages the head of the connecting bolt to hold the latter from working loose. The lock device forms no part of the invention.

What I claim is:—

1. The combination of a shaft, a wheel, a bushing on said shaft within the wheel having a flange which engages a face on said wheel, a device connecting said flange with said wheel and which is adapted to break under abnormal strain to release the wheel whereby the wheel can rotate on the bushing, and a lubricating chamber located on the inner side of said flange adjacent to the face of said wheel, the lubricant in said chamber remaining normally inactive until said wheel is released and then becoming active and lubricating the bearing faces of said bushing and said wheel, substantially as set forth.

2. The combination of a shaft, a wheel, a bushing on said shaft within the wheel having a flange which engages a face on said wheel, a bolt screwed into said flange and having a smooth part engaging a hole in the face of said wheel, said bolt being adapted to break under abnormal strain to release the wheel whereby the wheel can rotate on the bushing, and a lubricating chamber located on the inner side of said flange adjacent to the face of the wheel, the lubricant in said chamber remaining normally inactive until said wheel is released and then becoming active and lubricating the bearing faces of said bushing and said wheel, substantially as set forth.

3. The combination of a shaft, a wheel, a bushing on said shaft within the wheel having a flange which engages a face on said wheel, a device connecting said flange with said wheel and which is adapted to break under abnormal strain to release the wheel whereby the wheel can rotate on the bushing, and lubricating means confined between said flange and the face of said wheel, which means remain normally inactive but become active for lubricating the bearing faces of said bushing and said wheel when the wheel is released, substantially as set forth.

4. The combination of a shaft, a bushing fixed on said shaft, a wheel on said bushing, a bolt screwed into said bushing and having a smooth part engaging in holes in the wheel and bushing, and a sleeve of relatively hard metal surrounding the smooth part of said bolt in said bushing, substantially as set forth.

5. The combination of a shaft, a wheel, a bushing between said parts connected to said shaft and forming a journal for said wheel, connecting means between said bushing and said wheel adapted to release said wheel under abnormal strain whereby it can rotate on said journal, and a lubricating chamber located on the inner side of said bushing adjacent to said wheel, the lubricant in said chamber remaining normally inactive until said wheel is released and then becoming active and lubricating said journal, substantially as set forth.

Witness my hand this 12th day of October, 1904.

WILLARD F. RICHARDS.

Witnesses:
C. W. PARKER,
EDWARD C. HARD.